United States Patent [19]

Drewery

[11] Patent Number: 5,441,711
[45] Date of Patent: Aug. 15, 1995

[54] TABLET CHLORINATOR APPARATUS

[76] Inventor: T. Gig Drewery, Rte. 2 Box 464, Kountze, Tex. 77625-9319

[21] Appl. No.: 133,455

[22] Filed: Oct. 8, 1993

[51] Int. Cl.⁶ ............................................ B01D 11/02
[52] U.S. Cl. ................................ 422/264; 422/263; 422/278; 422/277; 137/268; 239/310
[58] Field of Search ............... 422/263, 264, 264 B, 422/275, 276, 277, 278; 222/189; 137/268; 239/222.11, 310

[56] References Cited

U.S. PATENT DOCUMENTS

| | | | |
|---|---|---|---|
| 2,142,947 | 1/1939 | Kretzschmar et al. | 422/264 B |
| 2,978,299 | 4/1961 | Milne | 422/278 |
| 4,023,778 | 5/1977 | Joly et al. | 239/310 X |
| 4,217,331 | 8/1980 | Schaub | 422/277 X |
| 4,353,876 | 10/1982 | Ballu et al. | 422/264 X |
| 4,842,729 | 6/1989 | Buchan | 422/263 X |

*Primary Examiner*—Robert J. Warden
*Assistant Examiner*—E. Leigh Dawson
*Attorney, Agent, or Firm*—Harrison & Egbert

[57] ABSTRACT

A chlorinator apparatus having a cannister with an interior for receiving a plurality of tablets therein, a plate affixed within the cannister and having a surface for supporting one of the tablets thereon, a fluid inlet positioned on the cannister to the plate for directing fluid flow toward the tablet on the plate, and a fluid outlet formed in the cannister so as to pass fluid flow from the cannister. The cannister has a generally cylindrical configuration. A diverter member is affixed to the plate adjacent the fluid inlet so as to divert fluid flow from the fluid inlet, The diverter is a generally V-shaped member having a narrow end adjacent the fluid inlet. The plate has an orifice formed therein so as to be in communication with the fluid outlet. A plurality of legs are formed on the plate so as to extend upwardly from the top surface of the plate.

14 Claims, 2 Drawing Sheets

FIG. 1
FIG. 2
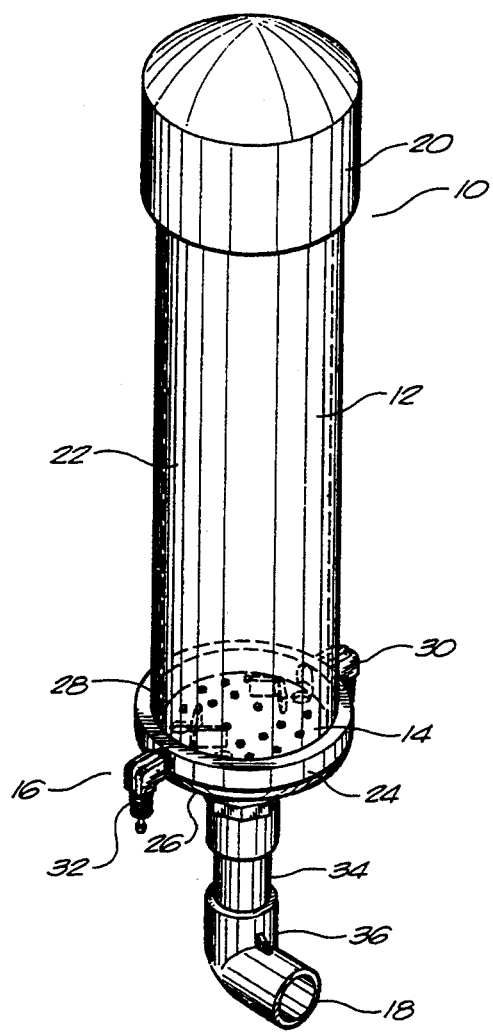
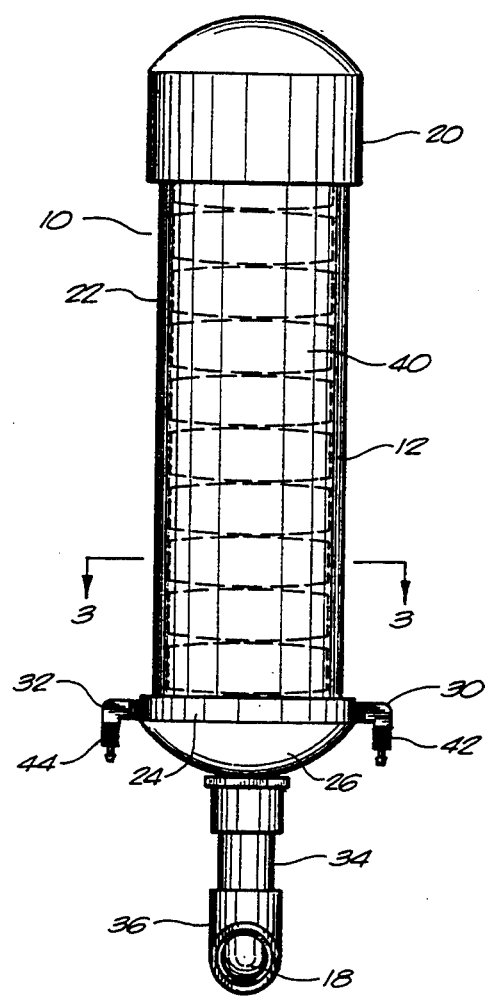

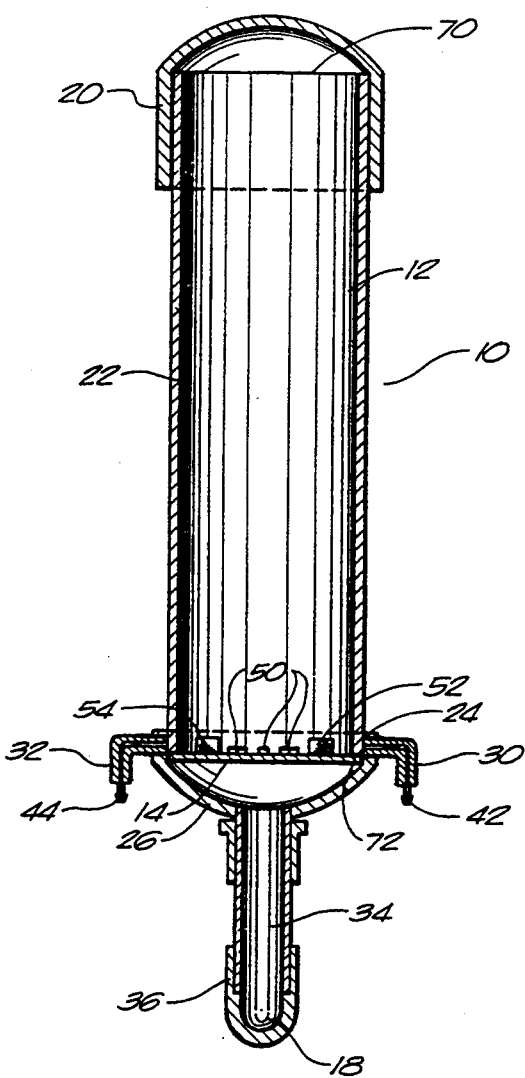

TABLET CHLORINATOR APPARATUS

TECHNICAL FIELD

The present invention is directed generally to a chemical feeder for providing a sanitizing chemical to water. More particularly, the present invention is directed to a chemical feeder which automatically provides controlled amounts of a sanitizing chemical to water in a circulating system.

BACKGROUND ART

A wide variety of techniques are known for the distribution of chlorine into a water system. Conventionally, chlorine tablets are used for the sanitizing of swimming pool and spa systems. The use of the chlorine serves to prevent the growth of bacteria and algae. In some circumstances, the chlorine tablets are simply thrown into the swimming pool or spa. In a wide variety of other applications, the chlorine material is provided to the water of the swimming pool or spa in a controlled manner.

A variety of other systems, such as irrigation and wastewater treatment systems, also require the use of chlorine. In such systems, the chlorine is also used so as to kill the harmful bacteria before the water is disposed of or reused, either for the purposes of direct discharge to the environment, irrigation or for household use. In recent years, there have been major efforts to convert household wastewater into a form which is useful for spray and drip irrigation. Under such circumstances, it is important that the wastewater effluent be disinfected before it can be reused. The introduction of chlorine is the most economical way to accomplish this.

One of the problems associated with the systems for controlling the introduction of chlorine into a water supply system is the inability to evenly control the flow and dissolution of the chlorine. Conventionally, chlorine is sold in the form of tablets. Typically, the chlorine is found in the form of calcium hypochlorite. In these tablets, approximately thirty percent of the material is inert material. Whenever water is mixed with these chlorine tablets, the chlorine from the tablets is introduced to the water. The calcium hypochlorite tablets are designed to disinfect and to dissipate rapidly. Unfortunately, the inert material also winds up in the water. Typically, the inert material will tend to wick the water up throughout the chlorinator apparatus and will also gunk and clog the components.

In virtually all chlorinator apparatus, the chlorine, from the chlorine tablets, will be unevenly dispersed into the water. As such, large variations in the amount of chlorine affecting the bacteria in the water will occur. Normally, conventional chlorinator apparatuses do not contact a full surface of the chlorine tablet evenly. Many times, the chlorine tablet will erode in pieces and in an uneven pattern. Whenever an uneven pattern of erosion occurs, an uneven distribution of chlorine to the water will result.

In the past, a wide variety of chlorinator devices have been the subject of U.S. patents. U.S. Pat. No. 4,023,778, issued on May 17, 1977, to Joly et al. discloses a device for mixing chemical products with tap water. This includes a magazine which is intended to accommodate the chemical products in the form of a solid tablet so that they have at least one free surface which remains constant during splitting. A means of introducing tap water is provided tangentially of that surface.

U.S. Pat. No. 4,250,911, issued on Feb. 17, 1981, to D. W. Kratz provides a chemical feeder with a disposable chemical container. This includes a casing provided with a vertically adjustable weir and a disposable container for chemicals for the treatment of the liquid which is received within the casing. The container is provided with an opening for extension therethrough of the weir to a preselected height consonant with the desired concentration of the solution to be formed. The liquid is introduced into the container from the feeder for dissolution of the chemical.

U.S. Pat. No. 4,294,280, issued on Oct. 13, 1981, to M. D. Tom teaches a device for supplying a detergent to a liquid dispenser. This includes a body having a hollow interior, a housing attached to the body, and a valve support member having a flap valve. The flap valve is manually controlled to divert flow from the inlet into the housing where the detergent cake is stored. The housing is oriented so as to drain through a second aperture to the outlet of the device.

U.S. Pat. No. 4,353,876, issued on Oct. 12, 1982, to Ballu et al. provides a device for mixing chemical products with running water. The tubular pipes for the supply of running water are situated in a different plane from the inlet plane of the mixing chamber disintegration zone.

U.S. Pat. No. 4,584,106, issued on Apr. 22, 1986, to W. L. Held discloses a chlorination system for distributing chlorine in a hot tub or spa. The system regulates the flow of water through a mixing chamber with a valve so as to control the rate of chlorine distribution. An assembly of venturis and baffles also regulates the flow of water through the mixing chamber and controls the size of the particles of the chlorination tablets that will flow out of the chlorination system.

U.S. Pat. No. 4,780,197, issued on Oct. 25, 1988, to M. L. Schuman describes a filter and chemical dispenser combination for treating water. This device includes a liquid inlet, a liquid outlet, and a flow passage between the inlet and the outlet. A filter element is positioned in the flow passage between the inlet and the outlet. Means are provided in the interior of the filter element and in the flow passage for supporting a chemical. The chamber includes a base for supporting the chemical.

U.S. Pat. No. 5,089,127, issued on Feb. 18, 1992, to Junker et al. describes a chemical feed apparatus having a collection reservoir and an erosion reservoir located within and spaced from the wall of the collection reservoir. An elongated cylinder is supported on the collection reservoir and the lower end of the cylinder is located in the collection reservoir. The collection reservoir has a water discharge outlet. The erosion reservoir has a water inlet with a valve to control the flow rate of water into the erosion reservoir. A cannister containing solid chemical sanitizing elements is supported in the cylinder. Openings are located in the lower end portion of the cannister so that solid dry chemical sanitizing elements, located in the lower end portion of the cannister, can be contacted by water in the erosion reservoir to erode and dissolve the solid elements.

It is an object of the present invention to provide a tablet chlorinator which evenly erodes the chlorine tablets.

It is another object of the present invention to provide a tablet chlorinator that provides consistent chlorine residuals in the effluent.

It is still a further object of the present invention to provide a tablet chlorinator which can be used to control bacteria in an effluent discharge system.

It is still a further object of the present invention to provide a tablet chlorinator which is relatively inexpensive, easy to use, and easy to maintain.

These and other objects and advantages of the present invention will become apparent from a reading of the attached specification and appended claims.

SUMMARY OF THE INVENTION

The present invention is a tablet chlorinator apparatus comprising a cannister having an interior for receiving a plurality of tablets therein, a plate affixed within the cannister and having a surface for supporting one of the tablets thereon, a fluid inlet positioned on the cannister adjacent to the plate for directing a fluid flow toward the tablet on the plate, and a fluid outlet formed in the cannister for passing the fluid flow from the cannister.

The cannister has a generally cylindrical configuration. The plate is positioned adjacent the bottom of the cannister. The cannister has a funnel area formed below the plate.

A diverter is affixed to the plate adjacent to the fluid inlet. The diverter serves to divert fluid flow from the fluid inlet. The diverter is essentially a generally V-shaped member having a narrow end adjacent to the fluid inlet. This V-shaped member extends upwardly above a top surface of the plate. The V-shaped member specifically includes a first section affixed to the plate and extending upwardly therefrom so as to form one leg of the V-shaped configuration. A second section is affixed to the plate and extends upwardly therefrom so as to form another leg of the V-shaped configuration. The first and second sections are separated by a greater distance at one end than at the other end.

The fluid inlet includes a first fluid inlet extending through a wall of the cannister and a second fluid inlet extending through the wall of the cannister approximately 180° from the first fluid inlet. Each of the first fluid inlet and the second fluid inlet serve to direct the flow toward each other. A first diverter member is positioned adjacent to the first fluid inlet. A second diverter member is positioned adjacent to the second fluid inlet.

The plate has an orifice formed therein. This orifice is in communication with the fluid outlet. Specifically, a first orifice is positioned adjacent to the first diverter member. The plate has a second orifice positioned adjacent to the second diverter member. Each of the first and second orifices is in communication with the fluid outlet. A third orifice is positioned adjacent to the opposite side of the first diverter member from the first orifice. The plate has a fourth orifice positioned adjacent to an opposite side of the second diverter member from the second orifice. The third and fourth orifices are in communication with the fluid outlet. The plate also has a plurality of legs extending upwardly from a top surface of the plate. These legs serve to support one of the tablets thereon.

BRIEF DESCRIPTION OF THE DRAWINGS

FIG. 1 is a perspective view of the tablet chlorinator apparatus in accordance with the preferred embodiment of the present invention.

FIG. 2 is a side elevational view of the tablet chlorinator apparatus in accordance with the preferred embodiment of the present invention.

FIG. 3 is a cross-sectional view taken across lines 3—3 of FIG. 2.

FIG. 4 is a cross-sectional view of the tablet chlorinator in accordance with the present invention.

DETAILED DESCRIPTION OF THE INVENTION

Referring to FIG. 1, there is shown at 10 the tablet chlorinator apparatus in accordance with the preferred embodiment of the present invention. The tablet chlorinator apparatus 10 includes a cannister 12, a plate 14, a fluid inlet 16, and a fluid outlet 18. As can be seen, the cannister 12 has an interior for receiving a plurality of chlorine tablets therein. The plate 14 is affixed within the cannister 12. The plate 14 has a surface for supporting one of the tablets thereon. The fluid inlet 16 is positioned on the cannister 12 adjacent to the plate 14. The fluid inlet 16 is designed so as to direct a fluid flow toward a tablet on the plate 14. The fluid outlet 18 is formed at the bottom of the cannister 12 so as to pass a fluid flow from the cannister.

As can be seen in FIG. 1, the cannister 12 has a generally cylindrical configuration. A cap 20 is removably affixed to the top of the cannister 12. The cylindrical body of the cannister 12 can be made of a generally clear plastic material. The cap 20 can be affixed to the cylindrical body 22 by simple placement, by threading, or by other attachment means. The cylindrical body 22 should have a suitable diameter so as to receive conventional chlorine tablets therein. The height of the cylindrical body 22 should be suitable so as to accommodate a plurality of chlorine tablets therein. The bottom of the cylindrical body 22 is received within an annular base member 24. The exterior surface of the cylindrical body 22 is generally in liquid-tight sealed relationship with the annular base 24. The cannister 12 also includes a generally funnel-shaped area 26 formed at the bottom below the plate 14.

The plate 14 will be described in greater detail in connection with FIG. 3. Essentially, plate 14 is a plate which is used to support a chlorine tablet thereon. The plate 14 is positioned at the bottom of the cylindrical body 22 of cannister 12. The plate 14 has a surface upon which a chlorine tablet will rest thereon. The plate 14 also includes orifices 28 which allow liquids to flow from the interior of the cannister 12 to the outlet 18.

The fluid inlet 16 includes a first fluid inlet 30 and a second fluid inlet 32. The first fluid inlet extends through the wall of the cylindrical body 22 of cannister 12. The second fluid inlet 32 extends through the wall of the cylindrical body 22 approximately 180° from the first fluid inlet 30. The first fluid inlet 30 directs fluid flow toward the second fluid inlet 32. The flow lines for water, or other liquids, can be attached to the fluid inlets 30 and 32.

A pipe 34 extends downwardly from the bottom of the cannister 12. An elbow member 36 is connected to pipe 34. The outlet 18 is formed at the outlet of the elbow 36. The outlet 18 allows the fluid from the interior of the cannister 12 to flow outwardly from the cannister 12 for use at another location. The pipe 34 and the elbow member 36 can be configured in various ways for the purposes of forming the outlet 18 of the present invention.

FIG. 2 shows the arrangement of tablets 40 within the interior of cannister 12. As can be seen, the chlorine tablets 40 are arranged in a stacked configuration on the interior of the cannister 12. The very bottom tablet 40 is supported on the top surface of the plate 14. The fluid inlets 30 and 32 are positioned so as to direct a flow of liquid across a bottom surface of the lowermost of the tablets 40. As the lowermost tablet 40 is dissolved, the chlorine and the inert materials will flow into the funnel area 26 below the plate 14. This will cause the chlorinated liquid to flow outwardly from the chlorinator apparatus 10 through the pipe 34, the elbow 36, and the outlet 18.

It can be seen that the fluid inlet 30 has a connector 42 formed thereon. Similarly, the fluid inlet 32 has a connector 44 formed thereon. Connectors 42 and 44 allow the fluid inlets 30 and 32, respectively, to be connected to a supply of water, or other liquid. It can be seen that the fluid inlets 30 and 32 are placed on opposite sides of the annular base 24 of the cannister 12.

The plate member 14 of the present invention is an important aspect of the present invention. The plate member 14 is configured so as to consistently, evenly, and controllably dissolve a chlorine tablet placed thereon. FIG. 3 illustrates, in detail, the configuration of the plate member 14 within the annular base 24 of the cannister 12.

Initially, it can be seen that the plate member 14 has a generally flat circular configuration. A plurality of legs 50 extend upwardly from the top surface of the plate 14 for approximately one-eighth of an inch. The legs 50 provide support for one of the tablets placed thereon. The legs 50 are configured so as to provide adequate support throughout the bottom surface of the tablet, while, at the same time, avoiding interruptions in the fluid flow along the top surface of the plate 14. A diverter member 52 is affixed to the plate adjacent to the first fluid inlet 30. The diverter 52 serves to divert fluid flow from the first fluid inlet 30. A second diverter member 54 is also provided on the top surface of the plate 14 on an opposite side of the plate from the first diverter member 52. It can be seen that the first diverter member 52 and the second diverter member 54 have a generally V-shaped configuration. The narrow end of the V-shaped configuration is generally adjacent to the fluid inlets 30 and 32. Each of the first diverter member 52 and the second diverter member 54 extend upwardly above the top surface of plate 14 for approximately one-quarter of an inch. Each of the diverter members 52 and 54 has a first section 56 which is affixed to the plate 14 and extends upwardly therefrom. This first section 56 forms one leg of the V-shaped configuration of the diverter members 52 and 54. A second section 58 is also affixed to the plate 14 and extends upwardly therefrom. This second section 58 forms another leg of the V-shaped configuration. As can be seen, the first section 56 and the second section 58 are separated by a greater distance at one end than at the other end.

When a fluid flow is introduced from the first fluid inlet 30 toward a first diverter member 52, the fluid flow will pass in three directions. First, the fluid flow will pass through the small opening between the sections 56 and 58. Secondly, a portion of the fluid flow will pass outwardly, by flowing along an outer surface of the first section 56. Thirdly, another portion of the fluid flow from the fluid inlet 30 will pass along the outer surface of the second section 58. This fluid flow creates a generally swirling and turbulent flow along the top surface of the plate 14.

At the same time, the second fluid inlet 32 will pass a first fluid flow between the sections 56 and 58, a second fluid flow along a surface of the first section 56, and a third fluid flow along the surface of the second section 58. When the fluid inlets 30 and 32 are operating simultaneously, the fluid flows will tend to circulate evenly along the surface of plate 14. This arrangement of flows will mix evenly and will tend to create a swirling effect which creates a maximum path of fluid travel along the surface of the plate 14.

In order to maximize the fluid travel along the surface of plate 14, a first orifice 60 is positioned adjacent to the first section 56 of the first diverter member 52. A second orifice 62 is positioned adjacent to the first section 56 of the second diverter member 54. The first orifice 60 and the second orifice 62 are in fluid communication with the fluid outlet 18. A third orifice 64 is positioned adjacent to the second section 58 of the first diverter member 52 on an opposite side of the first diverter member 52 from the first orifice 60. A fourth orifice 66 is positioned adjacent to the second section 58 of the second diverter member 54. This fourth orifice is positioned on an opposite side of the second diverter member 54 from the second orifice 62. The third orifice 64 and the fourth orifice 66 are in fluid communication with the fluid outlet 18.

The positioning of the orifices 60, 62, 64, and 66 enhances the maximum amount of fluid travel along the surface of the plate 14. As the fluid is introduced through the fluid inlets 30 and 32, a circulating path is created by the arrangement of diverter members along the surface 14. This liquid flow travels a maximum distance from the point of origin to the point of drain. The configuration of the small fluid inlets 30 and 32, along with the diverter members, allows a small volume of water to create maximum turbulence equally distributed along the surface of the plate 14. As a result, consistent chlorine residuals are maintained in the drained effluent.

FIG. 4 shows a cross-sectional view of the tablet chlorinator apparatus 10 of the present invention. As can be seen, the cannister 12 has a generally cylindrical body 22. The cap 20 is affixed over the outer surface of the cylindrical body 22 so as to close the top 70 of the cylindrical body 22 of the cannister 12. The bottom 72 of the cylindrical body 22 is received within the annular base 24. The annular base 24 forms a funnel area 26 below the plate 14. Funnel area 26 causes the chlorinated fluid to pass into the pipe 34 and through the elbow 36 of outlet 18.

In FIG. 4, it can be seen that the plate 14 has a first diverter member 52 affixed to the top surface of plate 14 adjacent to the first fluid inlet 30. Similarly, the second diverter 54 is affixed adjacent to an opening of the second fluid inlet 32. The legs 50 are provided on the plate 14 so as to act as a support for the chlorine tablet placed thereon.

Each of the fluid inlets 30 and 32 have a connector end 42 and 44, respectively. These connectors allow the fluid inlets 30 and 32 to be connected to a source of water. Under certain circumstances, the fluid inlets 30 and 32 can be connected to the discharge of a pretreatment facility. If household wastewater is to be treated with the chlorine material, then the household wastewater would pass through a pretreatment facility, be filtered, and then pass into the inlets 30 and 32 of the tablet chlorinator 10. Ultimately, the chlorinated discharge of the tablet chlorinator 10 could be used to disinfect water, for spray or drip irrigation, for direct discharge, or for use as part of an effluent management system. The fluid inlets 30 and 32 can also be used with intermittent or interruptible fluid flows. There is no requirement of the present invention that the fluid flow through the inlets 30 and 32 be constant. The turbulent action created by the diverters on the plate 14 allows small fluid flows to create consistent and even erosion of the chlorine tablets. The present invention is not limited to treatment of wastewater effluent, but can be used for the treatment of a variety of liquids.

In view of the consistent erosion of the chlorine tablet by the use of the arrangement of the present invention, a controlled chlorine solution flow to the discharge of the chlorinator apparatus 10 is created. The present invention eliminates the problem of uneven tablet dissolving and consequently uneven chlorine distribution. It also eliminates the problems created by the wicking and gunking of the interior of the cannister 12 (as occurs in other chlorinator devices). When the chlorine solution passes from the cannister 12, through the outlet 18, the chlorine solution can be used as desired.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A chlorinator apparatus comprising:
   a cannister means having an interior for receiving a plurality of tablets therein;
   a plate affixed within said cannister means;
   a fluid inlet means positioned on said cannister means adjacent said plate, said fluid inlet means for directing a fluid flow toward a bottom surface of a tablet supported on the plate, said fluid inlet means comprising:
      a first fluid inlet extending through a wall of said cannister means; and
      a second fluid inlet extending through said wall of said cannister means approximately 180° from said first fluid inlet, each of said first and second fluid inlets for directing fluid flow toward each other;
   a fluid outlet means formed in said cannister means, said fluid outlet means for passing said fluid flow from said cannister means; and
   a diverter means affixed to said plate adjacent said fluid inlet means, said diverter means for diverting fluid flow from said fluid inlet means, said diverter means comprising:
      a generally V-shaped member having a narrow end adjacent said fluid inlet means, said V-shaped member extending above a top surface of said plate.

2. The apparatus of claim 1, said cannister means having a generally cylindrical configuration, said plate positioned adjacent a bottom of said cannister means.

3. The apparatus of claim 2, said cannister means having a funnel area formed below said plate, said fluid outlet means comprising a port formed in said funnel area below said plate.

4. The apparatus of claim 1, said V-shaped member comprising:
   a first section affixed to said plate and extending upwardly therefrom, said first section forming one leg of said V-shaped member; and
   a second section affixed to said plate and extending upwardly therefrom, said second section forming another leg of said V-shaped member, said first section and said second section being separated by a greater distance at one end than at another end.

5. The apparatus of claim 1, said diverter means comprising:
   a first diverter member having a V-shaped configuration with a narrow end adjacent said first fluid inlet; and
   a second diverter member having a V-shaped configuration with a narrow end adjacent said second fluid inlet.

6. The apparatus of claim 5, said plate having a first orifice positioned adjacent said first diverter member, said plate having a second orifice positioned adjacent said second diverter member, each of said first and second orifices in communication with said fluid outlet means.

7. The apparatus of claim 1, said plate having an orifice formed therein, said orifice in communication with said fluid outlet means.

8. The apparatus of claim 1, said plate having a plurality of legs extending vertically upwardly from a top surface of said plate.

9. An apparatus for the controlled liquidation of chemical tablets comprising:
   a cannister means having an interior for receiving a plurality of tablets therein;
   a plate affixed within said cannister means;
   a first diverter member affixed to a top surface of said plate;
   a first fluid inlet means extending into said cannister means adjacent said plate, and first fluid inlet means for directing a first fluid flow toward said first diverter member on said plate, said first diverter member having a V-shaped configuration extending upwardly from said plate, said V-shaped configuration having a narrow end adjacent said first fluid inlet means; and
   fluid outlet means formed in said cannister means, said fluid outlet means for passing said first fluid flow from said cannister means.

10. The apparatus of claim 9, said plate having a first orifice positioned adjacent said first diverter member, said plate having a second diverter member affixed thereto, a second fluid inlet means extends into said cannister means adjacent said plate, said second fluid inlet means for directing a second fluid flow toward said second diverter member on said plate, said plate having a second orifice positioned adjacent said second diverter member, said first and second orifices communicating with said fluid outlet means.

11. The apparatus of claim 10, said second diverter member having a V-shaped configuration extending upwardly from said plate, said V-shaped configuration having a narrow end adjacent said second fluid inlet means.

12. The apparatus of claim 11, said V-shaped configuration comprising:
   a first section affixed to said plate and extending upwardly therefrom, said first section forming one leg of said V-shaped configuration; and
   a second section affixed to said plate and extending upwardly therefrom, said second section forming another leg of said V-shaped configuration, said first section and said second section being separated by a greater distance at one end than at another end.

13. The apparatus of claim 9, said second fluid inlet means positioned 180° from said first fluid inlet means.

14. The apparatus of claim 9, said plate having a plurality of legs extending vertically upwardly therefrom, said legs positioned between said first and second diverter members on said plate.

* * * * *